United States Patent
Ballot et al.

(10) Patent No.: US 10,575,127 B1
(45) Date of Patent: Feb. 25, 2020

(54) DYNAMIC DETERMINATION OF SMART MEETUP

(71) Applicant: OLX Global B.V., Hoofddorp (NL)

(72) Inventors: Johan Stephen Simeon Ballot, Berlin (DE); Camila Santos Matos de Freitas Ribeiro, Berlin (DE); Pedro Moreira Proenca, Berlin (DE)

(73) Assignee: OLX GLOBAL B.V., Hoofddorp (NL)

( * ) Notice: Subject to any disclaimer, the term of this patent is extended or adjusted under 35 U.S.C. 154(b) by 0 days.

(21) Appl. No.: 16/194,500

(22) Filed: Nov. 19, 2018

(51) Int. Cl.
| | |
|---|---|
| *H04W 4/02* | (2018.01) |
| *G06Q 30/06* | (2012.01) |
| *H04W 4/021* | (2018.01) |
| *H04W 4/029* | (2018.01) |

(52) U.S. Cl.
CPC ............ *H04W 4/023* (2013.01); *G06Q 30/06* (2013.01); *H04W 4/021* (2013.01); *H04W 4/029* (2018.02)

(58) Field of Classification Search
CPC ..... H04W 4/023; H04W 4/029; H04W 4/021; G06Q 30/06
USPC ...................................................... 455/456.1
See application file for complete search history.

(56) References Cited

U.S. PATENT DOCUMENTS

| | | | |
|---|---|---|---|
| 7,797,642 B1 * | 9/2010 | Karam ................. | G06Q 10/107 345/419 |
| 9,107,083 B1 * | 8/2015 | Ledet ..................... | G06F 16/29 |
| 9,264,849 B1 * | 2/2016 | Kahn ................. | G06F 16/24578 |
| 2004/0203901 A1 * | 10/2004 | Wilson .................. | H04W 64/00 455/456.1 |
| 2016/0127486 A1 * | 5/2016 | Chen ..................... | H04W 4/029 709/206 |
| 2016/0294958 A1 * | 10/2016 | Zhang ..................... | H04W 4/02 |
| 2017/0222964 A1 * | 8/2017 | Hoffman ................. | H04L 51/32 |

* cited by examiner

*Primary Examiner* — William Nealon
(74) *Attorney, Agent, or Firm* — Buckley, Maschoff & Talwalkar LLC (57) ABSTRACT

Provided are systems and methods for providing a smart meetup location to a plurality of user devices. In one example, the method may include one or more of receiving a request for a meetup location of a first user device and a second user device, dynamically determining a geographical position of the first user device based on current location information of the first user device, dynamically determining a geographical position of the second user device based on current location information of the second user device, selecting a meetup location from among a plurality of meetup locations based on the dynamically determined geographical positions of the first and second user devices, and outputting the selected meetup location to at least one of the first and second user devices.

20 Claims, 7 Drawing Sheets

DYNAMIC DETERMINATION OF SMART MEETUP

BACKGROUND

Selling second-hand goods offers several benefits, including promoting societal sustainability objectives by encouraging reuse of goods. Further, owners can earn extra spending money while simultaneously clearing out space for new items to be purchased. Owners of second-hand goods can sell these items through commerce-based websites and mobile applications. For example, a seller can post a second-hand item for sale via an online marketplace which enables a free exchange of items through the Internet. The posted sale item may include images of the item, a description of the item, reviews of the seller by other buyers with previous dealings, request for bids on the item, contact information of the seller, and the like. The content of the post can be viewed and interacted with by potential buyers through the website or the mobile app. In many cases, the online marketplace and the mobile application may facilitate communication between the seller and a potential buyer through various options, including an in-app chat window, push notifications, a text message conversation, an email exchange, or simply letting the buyer and seller list their email address and/or phone number information.

Various online marketplaces enable buyers to ship their second-hand items to sellers through the website or through a third party. However, shipping items can be expensive given that a second-hand item is often sold for only a small fraction of its original value. As a result, many sellers prefer to meet with the buyer and make the exchange (for payment), in-person, which can be a dangerous proposition. Online marketplaces may initially protect users by hiding geographical locations of the users. As a result, the buyer and seller may not be able to determine a convenient geographical location for the exchange without divulging their actual location to one another.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments that is shown but is to be accorded the widest scope consistent with the principles and features disclosed herein.

As the Internet continues to evolve, the selling of second-hand goods via commerce-based websites and mobile applications has become an increasingly popular activity. Users located at different geographical places may interact with each other through a common online marketplace (website) or mobile application where sellers place their second-hand items for sale. Interested users can chat, email, or even leave voice notes for sellers soliciting bids, barters, questions, and the like. Once a seller and a buyer have agreed to a price (or bartering of other goods), an exchange must occur. This exchange often happens in-person because it is easier for the buyer and the seller to meet at an intermediate location to ensure privacy, reduce the costs on shipping, and expedite the exchange (same day, etc.). However, one of the biggest concerns when meeting strangers is security. Online marketplaces and mobile applications do not have the ability to ensure that all users are well-intentioned. As a result, there is always a risk associated with meeting strangers.

The example embodiments alleviate some of the risks associated with interacting with strangers via online posting services. The system described herein may determine a "smart" meetup location for a pair of users (e.g., a buyer and seller, etc.) based on current locations of user devices without disclosing the location of the users to one another. In other words, actual locations of the users may remain hidden from each other while a smart meetup location that is convenient for both is selected by the host platform. For example, a buyer and seller may interact with each other through a chat window of a website, mobile application, or other service, to facilitate an offer and agreement. Through the chat window, one or both of the users may request a smart meetup, or the smart meetup could also be established as a default setting by the user so that it does not need to be initiated for each transaction. In response, the host platform may dynamically determine current locations of the user devices and select a secure location for the meetup. The chat window may be associated with a website, a mobile application, or the like. It can be appreciated that this system is applicable to all forms of online listings, including without limitation applications hosted on a desktop web browser or on a mobile device web browser, and the like.

Differing levels or degrees of secure locations may be provided for a meetup. As a non-limiting example only, a more secure location may include a police station, a fire station, or the like. A lesser secure location may include a government building, a hospital, and the like. Another example of a lesser secure location may include a restaurant, a coffee shop, a shopping mall, or the like. Each user may be provided with options of different locations or different types of locations to allow a user to configure or otherwise register their own desired locations for smart meetup thereby allowing users the ability to control a level of security. In some cases, two users involved in a smart meetup may have configured different levels of security. In a case where two users have differing levels of meetup security, the host platform may satisfy the strictest security request among the users.

The smart meetup also provides convenience to the users by finding an intermediate meetup location that is convenient for each of the pair of users and which is based on actual dynamic geographical locations of the users. As will be appreciated, users may supply or otherwise input a residence address during a registration process with the online marketplace or mobile application in order to submit online postings. However, users are not statically positioned. Therefore, the user's actual location may be different from the residence information provided during the registration process. According to various embodiments, rather than rely on static geographical locations input by a user during a registration process with the host, the platform may dynamically determine or otherwise select a meetup point that is based on current geographical positions of the users.

Figure 1:
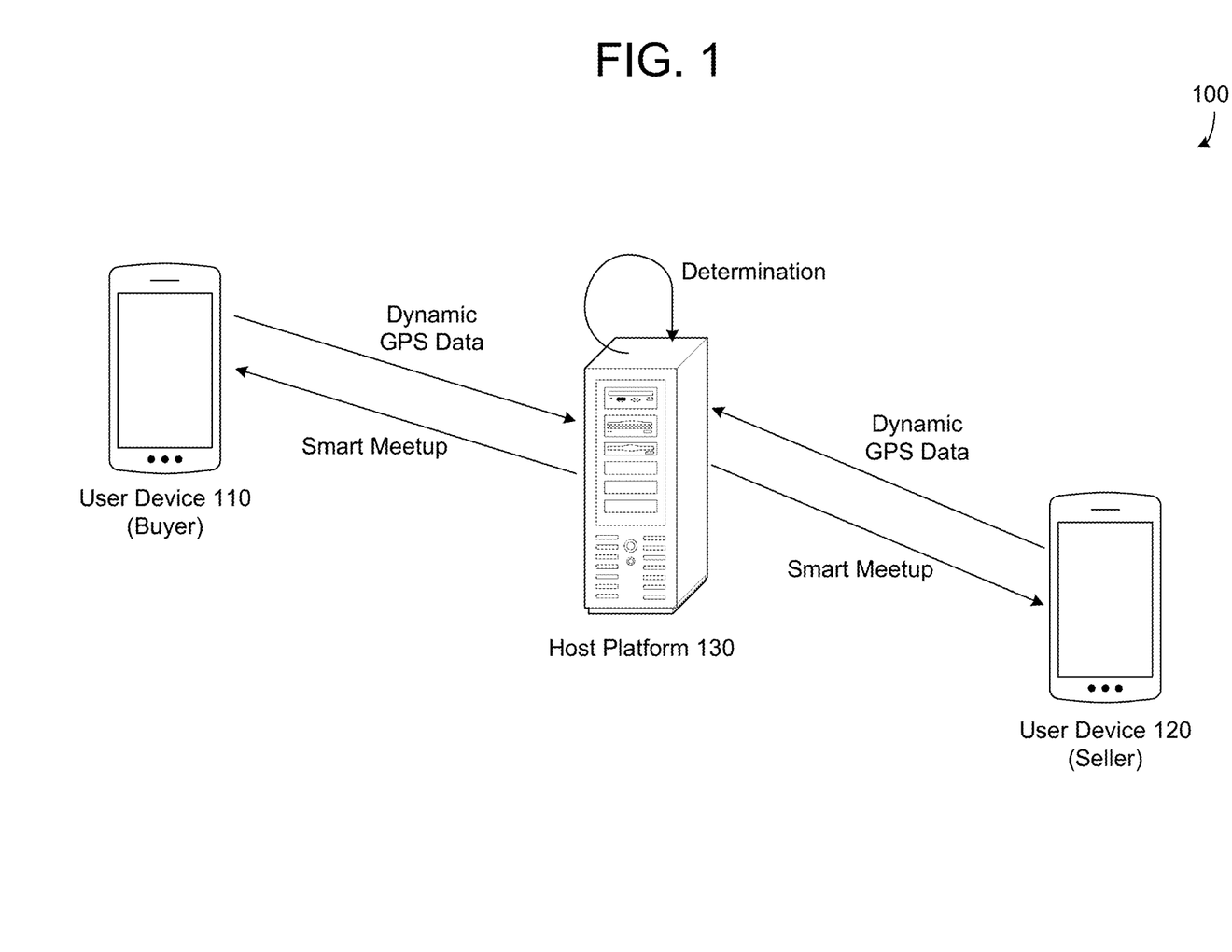
FIG. 1 is a diagram illustrating user devices communicating with one another via a host platform, in accordance with an example embodiment.

FIG. 1 illustrates user devices 110 and 120 which communicate with each other via a network and a host platform 130, in accordance with an example embodiment. The user devices 110 and 120 and the host platform 130 may be connected to each other via a network such as the Internet, a private network, a combination thereof, and the like. In the example of FIG. 1, the host platform 130 may host an online posting service such as a website, a mobile application, or the like, through which the user devices 110 and 120 may buy and sell second-hand goods. In some embodiments, the host platform 130 may host a chat service or chat window in association with the online posting service which enables the user devices 110 and 120 to communicate with one another and receive suggestions for smart meetup locations. Through the chat window, the user devices 110 and 120 may request or otherwise automatically trigger a meetup determination by the host platform 130.

In some embodiments, the host platform 130 may be a web server, a cloud platform, a database, a plurality of devices, and the like. Meanwhile, user devices 110 and 120 may be mobile devices such as mobile phones, tablets, laptops, notebook computers, smart-wearables, and the like. However, user devices 110 and 120 are not limited to mobile devices and may include devices with less mobility such as a desktop computer, a server, a workstation, or the like. To facilitate a smart meetup location, each of the user devices 110 and 120 may provide geographical positioning information to the host platform 130.

The geographical positioning information may include global positioning system (GPS) coordinates, internet protocol (IP) address information, location breadcrumbs, street-level address information in the form of alphanumeric text and numbers, and the like. The geographical information may be dynamic in that the location of the user devices 110 and 120 may change over time. In some embodiments, the user devices 110 and 120 may send periodic updates to the host platform 130 to update a geographical location of the user devices 110 and 120 stored at the host platform. As another example, the host platform 130 may transmit a request for geographical information from the user devices 110 and 120, for example, in response to a request for a smart meetup location.

The host platform 130 may dynamically determine locations of each of the user devices 110 and 120 and select a smart meetup location based on the dynamically determine locations of the user devices 110 and 120. The smart meetup location may be selected from a plurality of predefined locations which have been established as safe. In some cases, the meetup locations may have varying degrees of security, for example, a government agency building versus a restaurant, etc. Users may configure how secure they would prefer the meetup location to be, in advance, through the website, mobile application, or the like, which is hosted by the host platform.

After selecting a smart meetup location, the host platform 130 may output information about the smart meetup location to displays of the first and second user devices 110 and 120. For example, a map from a current location to the smart meetup, an address of the smart meetup, traffic conditions, estimated time of arrival, a name of the smart meetup location, and the like. In some cases, the user device 110 may receive a route mapping from a current location of the user device 110 to the meetup location while the user device 120 may receive a route mapping from a current location of the user device 120 to the meetup location. Here, the location of the user device 120 may remain hidden to the user device 110, and vice versa, maintaining the user's privacy.

Figure 2:
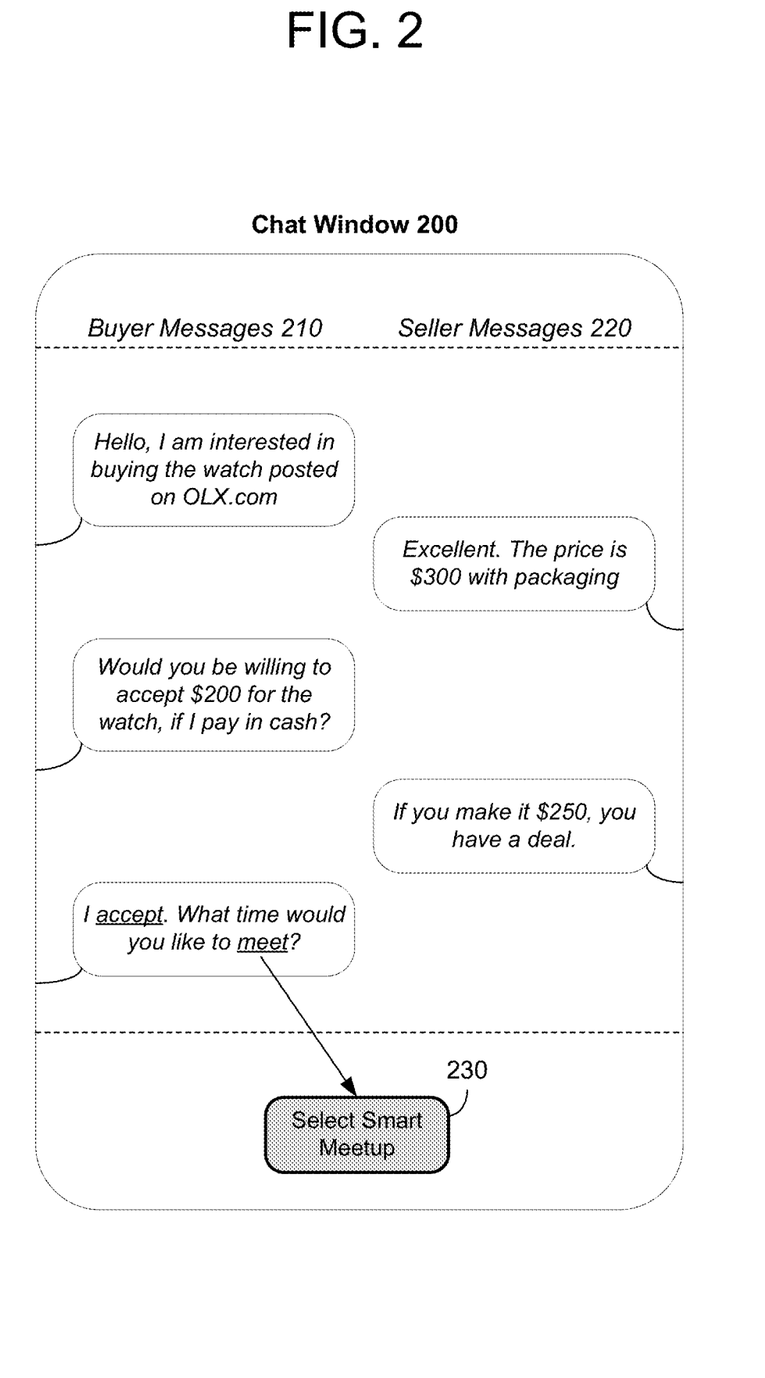
FIG. 2 is a diagram illustrating an example of a chat window which triggers a smart meetup, in accordance with example embodiments.

FIG. 2 illustrates an example of a chat window 200 in association with a smart meetup, in accordance with example embodiments. Content within the chat window 200 may be detected by a host platform causing the host platform to automatically trigger a determination of a smart meetup. As another example, a button or other option may be presented to user devices participating in the chat via a user interface of the chat window 200 enabling a user to select a smart meetup determination. Referring to the example of FIG. 2, the chat window 200 include a text messaging chat between a buyer and a seller. In some embodiments, the web chat window 200 may be an interface used with a web browser, a mobile application, a mobile browser, and the like, and may be used in conjunction with a service for online listings of items for sale such as second-hand goods, etc.

Each of the users may post messages back in forth with one another. For example, buyer message 210 and seller messages 220 may be displayed within the chat window 200. The host platform may detect various keywords or actions which may trigger an automatic smart meetup determination. As another example, the host platform may detect various keywords or actions which trigger a smart meetup request button 230 to be displayed within the chat window 200 of a screen of either of the buyer or seller devices. Here, either user may select the button 230 causing the host platform to determine a smart meetup location based on the current locations of the buyer and seller devices. As another example, the option to select a smart meetup (such as button 230) may always be present within the user interface of either of the buyer and seller devices.

According to various embodiments, a smart meetup location can be launched from or otherwise in association with the chat window 200 by the host platform. For example, information about a smart meetup location such as a map, directions, options, geographical data, timing information, route information, and the like, may be displayed via the chat window 200 or in a window that is also shown on the screen in association with the chat window such as an adjacent window, etc. In other words, the system described herein may automatically determine a smart meetup between a pair of users is needed based on a chat session being performed in the chat window 200. Furthermore, the system may output a smart meetup location based on actual locations of the user performing the chat session within the chat window 200 without divulging locations of the users to each other. Example of a smart meetup location being displayed are shown in FIGS. 3A and 3B.

It should also be appreciated that the smart meetup location may be provided to both user devices when they are not involved in a communication via a chat window. For example, the smart meetup may be provided in response to one of the user devices submitting a request to the host platform such as through an SMS message, an email, and the like. As another example, the host system may determine to launch a smart meetup location based on content within a SMS message from one user to another, an email from one user to another, or the like. As another example, either user may directly request a smart meetup location from a mobile application or web browser on a respective user device.

Figure 3A:
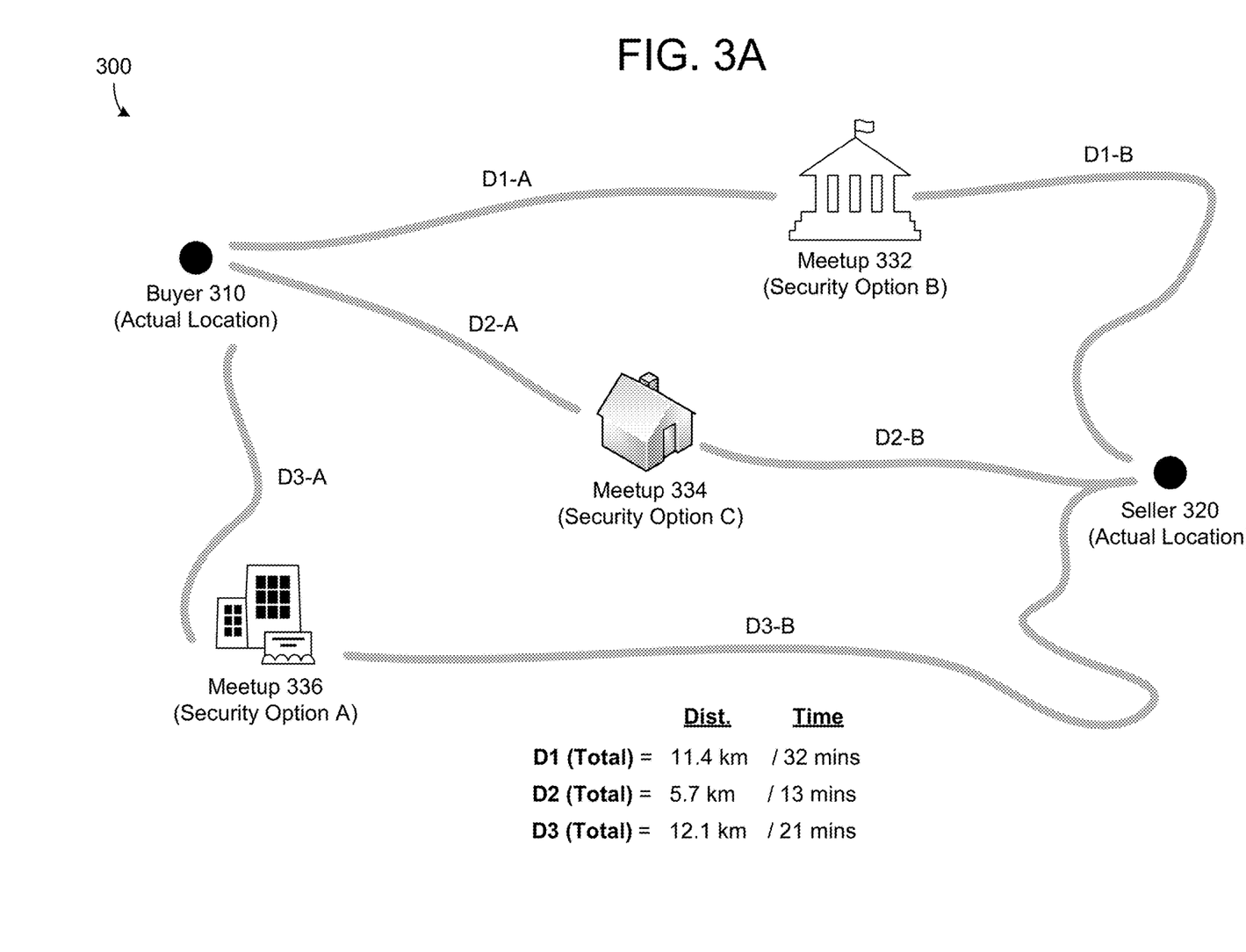
FIG. 3A is a diagram illustrating a process of selecting a smart meetup location in accordance with an example embodiment.
Figure 3B:
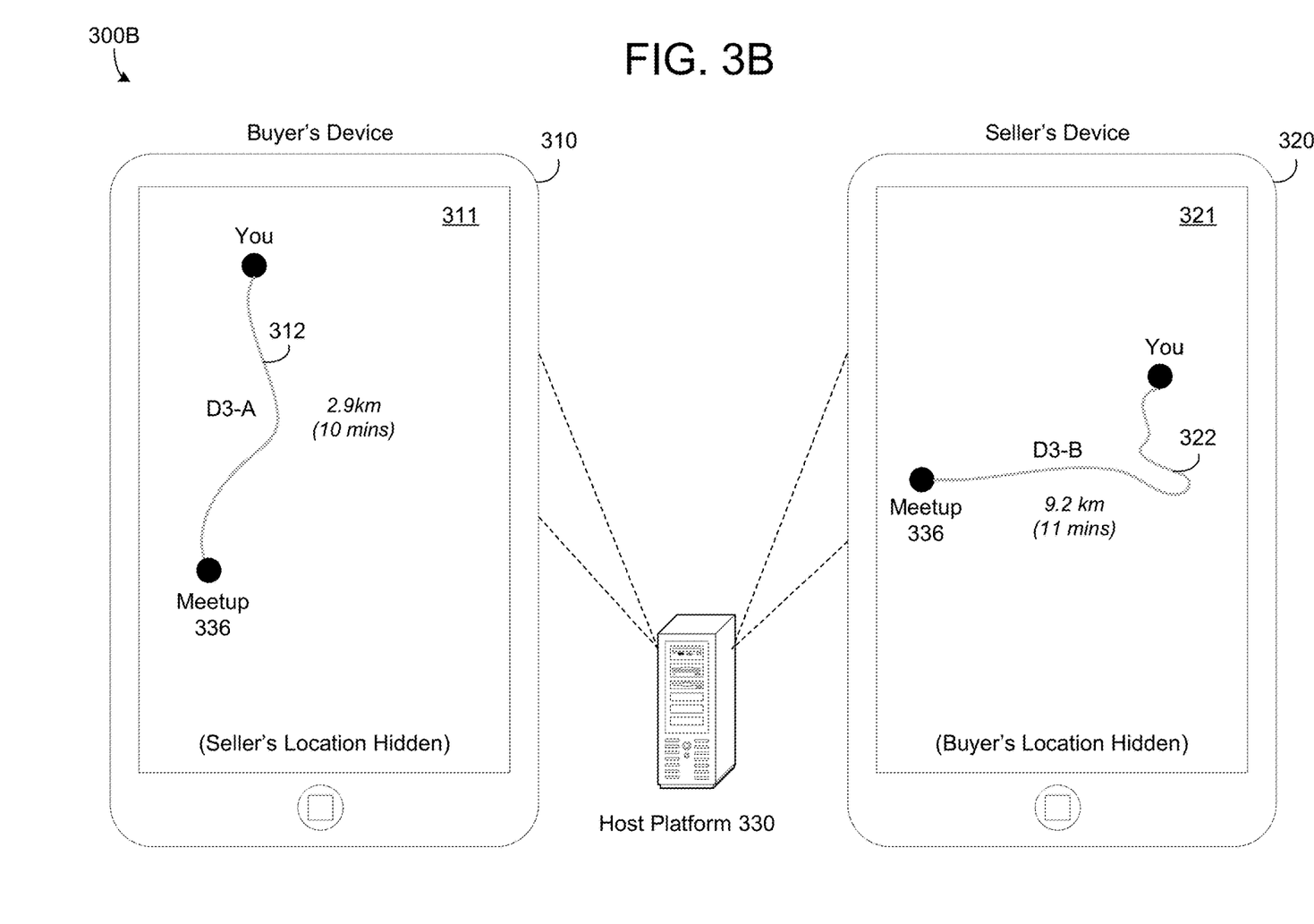
FIG. 3B is a diagram illustrating a process of outputting information about the selected smart meetup location to different users devices in accordance with an example embodiment.

FIG. 3A illustrates a process 300A of selecting a smart meetup location in accordance with an example embodiment, and FIG. 3B illustrates a process 300B of outputting information about the selected smart meetup location to different user devices in accordance with an example embodiment. Referring to the example of FIG. 3A, a host platform (e.g., host platform 330 in FIG. 3B, etc.) may receive geographical location information from a pair of user devices. In this example, a location 310 of a first device (e.g., buyer) is dynamically determined on a map based on location information received from the first device. Likewise, a location 320 of a second device (e.g., seller) is dynamically determined on the map based on location information received from the second device. The location information may include GPS coordinates, IP address information, address-level data, and/or the like. For example, the first and second device may communicate with one another via a chat window.

Next, the host platform may receive or automatically trigger a request for a smart meetup location. According to various embodiments, the host platform may identify available meetup locations within a geographical area of the first and second devices and select a meetup location based on user preferences of the first and second devices. In this example, the host platform identifies three possible meetup locations including a meetup location 332 having a security level of option B, a meetup location 334 having a security level of option C, a meetup location 336 having a security level of option A. The host platform may determine a best possible meetup location based on distance (which may be actual distance to travel or time of travel), security level preferences, and the like. In some embodiments, the host platform may determine the best meetup location based on a combination of attributes.

In the example of FIG. 3A, the low security meetup location 334 requires the least travel distance in both kilometers (km) and time (mins). Therefore, if both users have a level C option for security preference or no security preference, the system can identify the security meetup location 334 from among the possible meetup locations because it requires the least amount of total travel in both distance (km) and time (mins). In these examples, the total travel time represents an aggregate of distance (or time) covered by both the seller and the buyer to reach the possible meetup location.

As another example, if one of the first and second users requires at least option B level of security, the security meetup location 334 can be disregarded and a best possible selection from among security meetup location 332 and security meetup location 336 may be selected. In this example, the security meetup location 332 requires less total travel distance (11.4 km) but greater total travel time (32 mins) than the security meetup location 336 which requires a travel distance of (12.1 km) and a total travel time of (21 mins). In this case, the host platform may select the security meetup location 336 because it satisfies the minimum level of security options requested for both of the buyer and the seller, and because it requires the least amount of total travel time.

FIG. 3B illustrates the output from the host platform to each of the buyer device 310 and the seller device 320 in response to the security meetup location 336 of FIG. 3A being selected for a meetup location by the host platform. In this example, a user interface 311 of the buyer's device 310 illustrates a travel path 312 on a map between a current physical location of the buyers device 310 and the security meetup location 336. Meanwhile, a user interface 321 of the seller's device 320 illustrates a travel path 322 on a map between a current physical location of the seller's device 320 and the security meetup location 336. The user interfaces 311 and 312 may be associated with a chat window where both users are discussing terms and conditions of a sale of a second-hand item such as between a buyer and a seller. The user interfaces 311 and 312 may be shown within a same window as the chat window, or adjacent to the chat window. As another example, the smart meetup may be provided without a chat window (or without being triggered from a chat window.)

Here, the host platform 330 may output a different view of the map for each of the buyer's device 310 and the seller's device 320. In particular, the host platform 330 may hide a location of the seller's device 320 on the user interface 311 of the buyer's device 310. Likewise, the host platform 330 may hide a location of the buyer's device 310 on the user interface 321 of the seller's device 320. Accordingly, privacy and security can be improved by preventing actual locations of the buyer and seller from being exchanged, while also providing the smart meetup location 336 to each of the users.

Figure 4A:
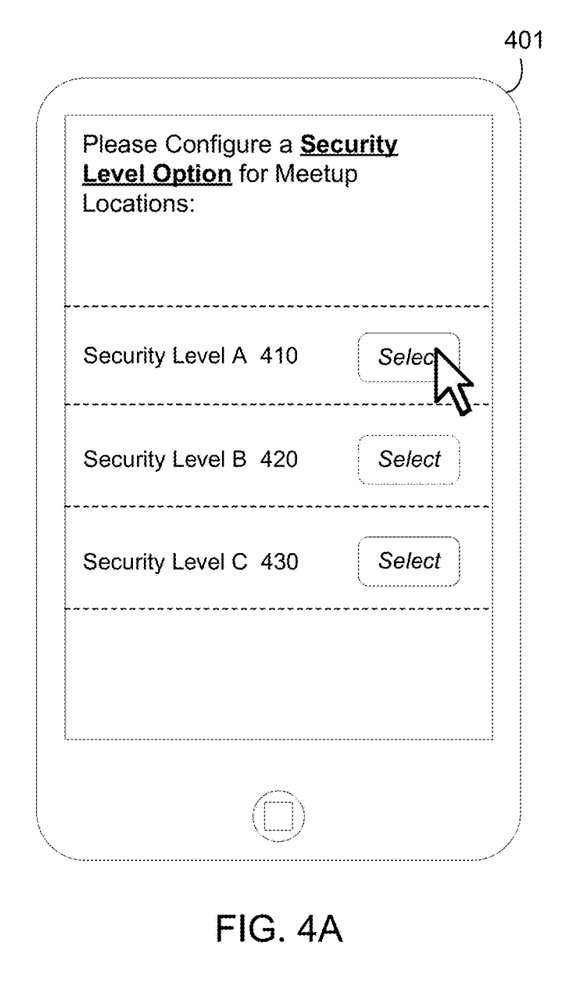
FIG. 4A is a diagram illustrating a user interface for configuring security settings of a smart meetup location in accordance with an example embodiment.
Figure 4B:
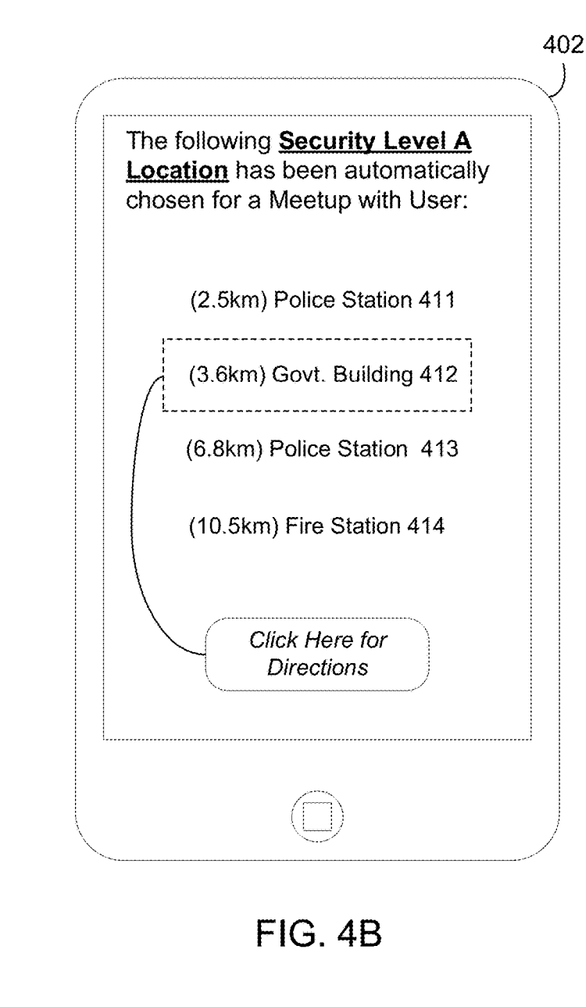
FIG. 4B is a diagram illustrating a user interface of a smart meetup location automatically provided in accordance with an example embodiment.

FIG. 4A illustrates a user interface 401 for configuring security options of a smart meetup location in accordance with an example embodiment, and FIG. 4B illustrates a user interface 402 of a smart meetup location automatically provided based on security option that has been selected in accordance with an example embodiment. Referring to FIG. 4A, the user interface 401 may include a web browser or mobile browser, a mobile application screen shot/page, or the like. In this example, the screen shot shows a plurality of differing options or levels of security (e.g., security level A 410, security level B 420, and security level C 430, etc.) which may be set for smart meetup determinations. Each user may independently customize their own level of security based on options provided from a host platform. The host platform may generate options for the user and allow the user to determine how secure of a meetup location or a type of meetup location they prefer. For example, a user may prefer only government buildings or police stations, while another user may prefer any type of location. In this example, security level A represents a most secure option, security level B represents a less secure option, and security level C represents a least secure option. The different levels of security may be predefined by the host platform.

The host platform may generate different options for security allowing a user to choose their own desired level of security. For example, the levels of security may be associated with the type of location. For example, security level A may be associated with a police station, a fire station, etc. As another example, security level B may be associated with a hospital, a government building, or the like. As another example, security level C may be associated with a grocery store, a convenience store, a coffee shop and the like. The host platform may accommodate the greatest level of security among a pair of users for which a smart meetup location is determined. Here, one or more predefined rules may exist that enable a host platform to choose a more secure location over a less secure location. The security levels A, B, and C are simply for purposes of example and are not meant to limit the understanding that different levels of security may be provided by smart meetup locations. It should be appreciated that the locations discussed herein are just for example.

In the example of FIG. 4A, the user may select the security level A 410 option from among the possible choices. When the host platform determines to provide a smart meetup location to either of the user devices, the host platform may automatically select a meetup location based on geographical locations dynamically determined of the pair of devices. Here, the host platform may determine a level of security requested by or required by a user when making a selection. In some embodiments, the host platform may select a smart meetup location that satisfies the greatest security requirement among the users. The greatest security requirement may be determined by a back-end server based on a predefined order of selection. For example, a police station may be a more secure option than a coffee shop, etc.

In the example of FIG. 4B, the host platform automatically identifies four possible smart meetup locations 411-414 which can be selected based on a current geographical position of the pair of user devices. Here, the host platform may further automatically select a choice of the smart meetup location 412 corresponding to a government building. This selection may be based on travel time (instead of distance). As another option, the host platform may output a plurality of possible smart meetup locations to one of the user devices and allow one of the user devices to choose a smart meetup location from among a plurality of possible smart meetup locations.

Figure 5:
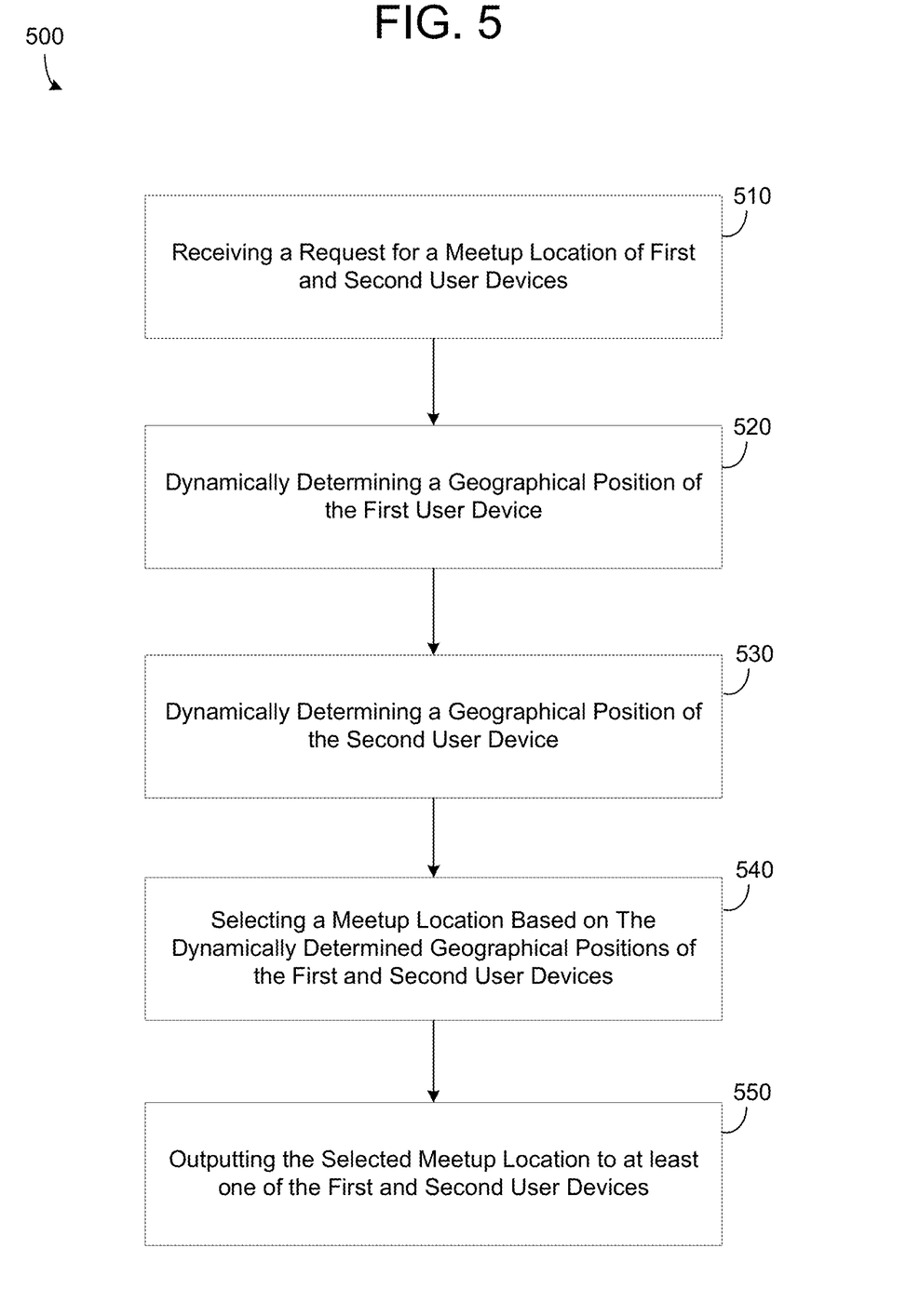
FIG. 5 is a diagram illustrating a method for determining a smart meetup location in accordance with example embodiments.

FIG. 5 illustrates a method 500 for determining a smart meetup location in accordance with example embodiments. For example, the method 500 may be performed by a web server, a host platform, a cloud platform, a database, and/or the like. In some embodiments, the method may be performed by a host server of a mobile application, however, embodiments are not limited thereto. Referring to FIG. 5, in 510, the method may include receiving a request for a meetup location of a first user device and a second user device which have hidden locations from one another. Here, the user devices may be mobile devices (e.g., tablets, mobile phones, smart-wearables, etc.), stationary device (e.g., desktops, servers, appliances, etc.), and the like, which communicate with the host via a network such as the Internet or private network. For example, the request may be automatically triggered by an application on one of the user devices based on content such as keywords, phrases, responses, and the like, within a chat window between two users such as a buyer and a seller. As another example, the request may be selected by any of the first and second user devices via a user interface displayed on a screen thereof, or via another input means such as voice command, gesture, or the like.

In some embodiments, the request for the meetup location is received from a web-based chat application executing a chat window between the first and second user devices. In some cases, the request may be automatically generated by the web-based chat application based on one or more keywords of text content detected within the chat window. As another example, the request may be triggered or otherwise received in response to an input from one first and second user devices via the chat window.

In 520, the method may include dynamically determining a geographical position of the first user device based on current location information of the first mobile device, and in 530, dynamically determining a geographical position of the second user device based on current location information of the second mobile device. For example, the first and second user devices may transmit geographical location information to the host platform. For example, the geographical information may be captured by each mobile device and may include global positioning system (GPS) coordinates, IP address information, physical address information (e.g., street name, city, country, etc.), location breadcrumbs, and the like. The geographical information may be captured in response to a trigger command from the host platform. The geographical location information may be different than an address that is initially provided to a website or an application during a registration process. Rather, the geographical location information may be current actual geographic location data of the respective user device which can be in transit.

In 540, the method may include selecting a meetup location from among a plurality of meetup locations based on the dynamically determined geographical positions of the first and second user devices, and in 550, outputting the selected meetup location to at least one (or both) of the first and second user devices. According to various aspects, the plurality of meetup locations may include a plurality of differing options or degrees of security. For example, the selecting may include selecting a meetup location from among the plurality of meetup locations based on a degree of security requested by one or more the first and second user devices and a degree of security provided by the respective meetup location. As another example, the selecting may include selecting a meetup location that requires a greater travel distance between the first and second user devices but less travel time than another meetup location among the plurality which requires less travel distance between the first and second mobile devices but greater travel time.

The above embodiments may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
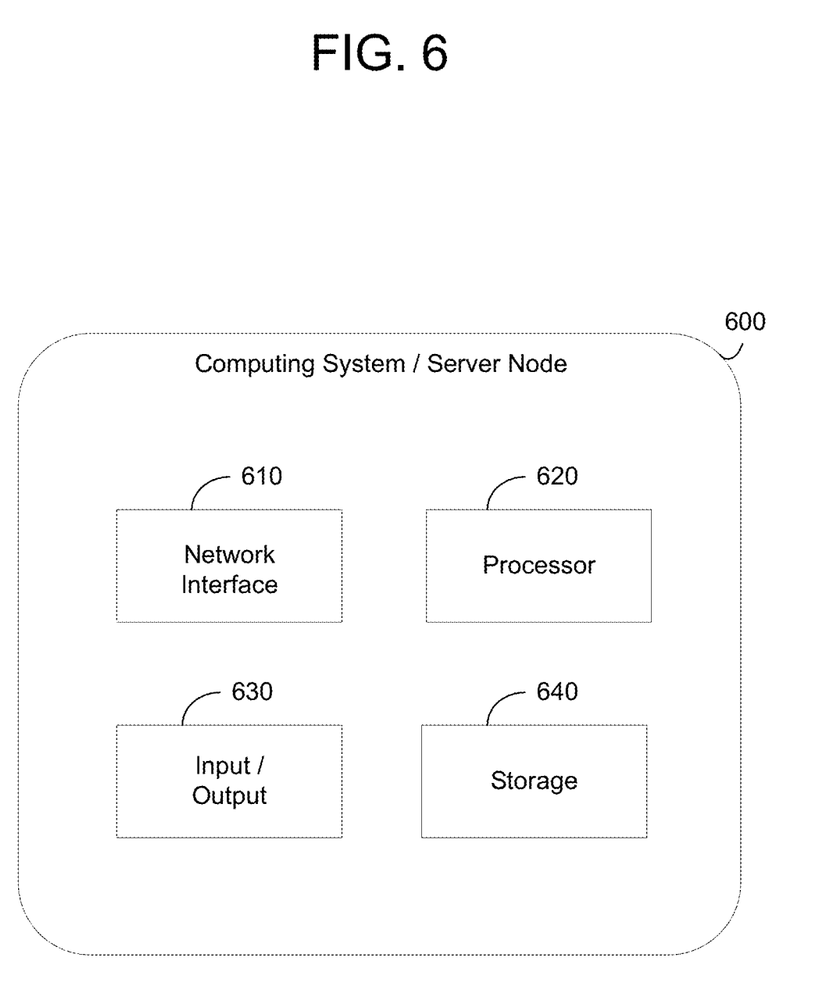
FIG. 6 is a diagram illustrating a computing system for performing the methods and processes of the example embodiments.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 6 illustrates an example computer system 600 which may represent or be integrated in any of the above-described components, etc. FIG. 6 is not intended to suggest any limitation as to the scope of use or functionality of embodiments of the application described herein. The computing system 600 is capable of being implemented and/or performing any of the functionality set forth hereinabove.

The computing system 600 may include a computer system/server, which is operational with numerous other general purpose or special purpose computing system environments or configurations. Examples of well-known computing systems, environments, and/or configurations that may be suitable for use as computing system 600 include, but are not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like. According to various embodiments described herein, the computing system 600 may be a web server.

The computing system 600 may be described in the general context of computer system-executable instructions, such as program modules, being executed by a computer system. Generally, program modules may include routines, programs, objects, components, logic, data structures, and so on that perform particular tasks or implement particular abstract data types. The computing system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computing system 600 is shown in the form of a general-purpose computing device. The components of computing system 600 may include, but are not limited to, a network interface 610, one or more processors or processing units 620, an input/output 630 which may include a port, an interface, etc., or other hardware, for inputting and/or outputting a data signal from/to another device such as a display, a printer, etc., and a storage device 640 which may include a system memory, or the like. Although not shown, the computing system 600 may also include a system bus that couples various system components including system memory to the processor 620. In some embodiments, the input/output 630 may also include a network interface.

The storage 640 may include a variety of computer system readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 640 can read and write to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, storage device 640 may include at least one program product having a set (e.g., at least one) of program modules that are configured to carry out the functions of various embodiments of the application.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Although not shown, the computing system 600 may also communicate with one or more external devices such as a keyboard, a pointing device, a display, etc.; one or more devices that enable a user to interact with computer system/server; and/or any devices (e.g., network card, modem, etc.) that enable computing system 600 to communicate with one or more other computing devices. Such communication can occur via I/O interfaces. Still yet, computing system 600 can communicate with one or more networks such as a local area network (LAN), a general wide area network (WAN), and/or a public network (e.g., the Internet) via network interface 610. As depicted, network interface 610 may also include a network adapter that communicates with the other components of computing system 600 via a bus. Although not shown, other hardware and/or software components could be used in conjunction with the computing system 600. Examples include, but are not limited to: microcode, device drivers, redundant processing units, external disk drive arrays, RAID systems, tape drives, and data archival storage systems, etc.

According to various embodiments, the processor 620 may receive a request for a meetup location of a first user device and a second user device. Here, the first and second user devices may be disposed at geographical locations which are hidden or unknown to one another. For example, the request may be received from a mobile application hosted by the computing system 600 or through a transmission from one of the first and second user devices, via a network. The processor 620 may dynamically determine a geographical position of the first user device and the second user device based on current location information of the first user device and the second user device, respectively. The processor 620 may select a meetup location from among a plurality of meetup locations based on the dynamically determined geographical positions of the first and second user devices. The network interface 610 may transmit the selected meetup location to at least one of the first and second user devices.

In some embodiments, the network interface 610 may receive the respective current location information transmitted from the first and second user devices. For example, the current location information may include GPS coordinates, IP address information, location breadcrumbs, and the like, which are captured by the respective devices and which identify a dynamic location of the device which may be different from the registered address of the device that is provided during an initial registration process with the website, mobile application, service, or other online posting system.

In some embodiments, the processor 620 may receive the request for the meetup location from a web-based chat application executing a chat window between the first and second user devices. For example, the request may be automatically generated by the web-based chat application based on one or more keywords of text content detected within the chat window. In some embodiments, the request may be received in response to an input from one first and second user devices via the chat window.

In some embodiments, the plurality of meetup locations may include a plurality of differing degrees or options for security. For example, the processor 620 may select a meetup location from among the plurality of meetup locations based on a greatest or highest degree of security requested by one or more the first and second user devices and a degree of security provided by the respective meetup location. As another example, the processor 620 may select a meetup location that requires a greater travel distance between the first and second user devices but less travel time than another meetup location among the plurality that requires less travel distance between the first and second user devices but greater travel time.

It will be readily understood that descriptions and examples herein, as generally described and illustrated in the figures, may be arranged and designed in a wide variety of different configurations. Thus, the detailed description of the embodiments is not intended to limit the scope of the application as claimed but is merely representative of selected embodiments of the application. One of ordinary skill in the art will readily understand that the above may be practiced with steps in a different order, and/or with hardware elements in configurations that are different than those which are disclosed. Therefore, although the application has been described based upon some preferred embodiments, it would be apparent to those of skill in the art that certain modifications, variations, and alternative constructions would be apparent.

What is claimed is:

1. A computing system comprising:
   a processor configured to
      receive a request for a meetup location of a first user device and a second user device,
      dynamically determine a geographical position of the first user device based on current location information of the first user device,
      dynamically determine a geographical position of the second user device based on current location information of the second user device, and
      select a meetup location from among a plurality of meetup locations based on the dynamically determined geographical positions of the first and second user devices while preventing the determined geographical position of the first user device from being disclosed to the second user device and the determined geographical position of the second user device from being disclosed to the first user device, wherein the plurality of meetup locations comprise a plurality of differing degrees of security; and
   a network interface configured to transmit the selected meetup location to at least one of the first and second user devices.

2. The computing system of claim 1, wherein the processor receives the request for the meetup location from a web-based chat application executing a chat window between the first and second user devices.

3. The computing system of claim 2, wherein the request is automatically generated by the web-based chat application based on one or more keywords of text content detected within the chat window.

4. The computing system of claim 2, wherein the request is received in response to an input from one of the first and second user devices via the chat window.

5. The computing system of claim 1, wherein the network interface is further configured to receive the respective current location information transmitted from the first and second user devices.

6. The computing system of claim 1, wherein the current location information of the first and second user devices comprises one or more of global positioning system (GPS) coordinates, an internet protocol (IP) address, and geographical address information.

7. The computing system of claim 1, wherein the processor is further configured to select a meetup location from among the plurality of meetup locations based on a degree of security requested by one or more the first and second user devices and a degree of security provided by the respective meetup location.

8. The computing system of claim 1, wherein the processor is configured to select a meetup location based on current travel time rather than travel distance.

9. A method comprising:
   receiving a request for a meetup location of a first user device and a second user device;
   dynamically determining a geographical position of the first user device based on current location information of the first user device;
   dynamically determining a geographical position of the second user device based on current location information of the second user device;
   selecting a meetup location from among a plurality of meetup locations based on the dynamically determined geographical positions of the first and second user devices while preventing the determined geographical position of the first user device from being disclosed to the second user device and the determined geographical position of the second user device from being disclosed to the first user device, wherein the plurality of meetup locations comprise a plurality of differing degrees of security; and
   outputting the selected meetup location to at least one of the first and second user devices.

10. The method of claim 1, wherein the request for the meetup location is received from a web-based chat application executing a chat window between the first and second user devices.

11. The method of claim 10, wherein the request is automatically generated by the web-based chat application based on one or more keywords of text content detected within the chat window.

12. The method of claim 10, wherein the request is received in response to an input from one of the first and second user devices via the chat window.

13. The method of claim 9, further comprising receiving, via a network interface, the respective current location information transmitted from the first and second user devices.

14. The method of claim 9, wherein the current location information of the first and second user devices comprises one or more of global positioning system (GPS) coordinates, an internet protocol (IP) address, and geographical address information.

15. The method of claim 9, wherein the selecting further comprises selecting a meetup location from among the plurality of meetup locations based on a degree of security requested by one or more the first and second user devices and a degree of security provided by the respective meetup location.

16. The method of claim 9, wherein the selecting comprises selecting a meetup location based on a current travel time rather than a travel distance.

17. A non-transitory computer readable medium comprising program instructions which when executed cause a computer to perform a method comprising:
receiving a request for a meetup location of a first user device and a second user device;
dynamically determining a geographical position of the first user device based on current location information of the first user device;
dynamically determining a geographical position of the second user device based on current location information of the second user device;
selecting a meetup location from among a plurality of meetup locations based on the dynamically determined geographical positions of the first and second user devices while preventing the determined geographical position of the first user device from being disclosed to the second user device and the determined geographical position of the second user device from being disclosed to the first user device, wherein the plurality of meetup locations comprise a plurality of differing degrees of security; and
outputting the selected meetup location to at least one of the first and second user devices.

18. The non-transitory computer readable medium of claim 17, wherein the request for the meetup location is received from a web-based chat application executing a chat window between the first and second user devices.

19. The computing system of claim 1, wherein the processor selects the meetup location based on security configuration settings for at least one of the first and second user devices and a security attribute associated with the meetup location.

20. The computing system of claim 1, wherein the first and second user devices have different security requirements, and the processor selects the meetup location based on a strictest security requirement from among different security requirements of the first and second user devices.

* * * * *